Patented Dec. 6, 1949

2,490,078

UNITED STATES PATENT OFFICE 2,490,078

MANUFACTURE OF PLASTIC PRODUCTS FROM WOOD (SULFUR COOK PROCESS)

John G. Meiler, Tacoma, Wash., assignor to Diamond Alkali Company, Cleveland, Ohio, a corporation of Delaware No Drawing. Application April 12, 1946, Serial No. 661,913

12 Claims. (Cl. 106—123)

1

The present invention relates generally to the production of a plastic product from wood. More particularly, the invention relates to a method of digesting wood in the presence of elemental sulfur in an alkaline solution, preferably one containing dissolved ligneous material, to produce a composition that can be molded or otherwise formed into a product that is definitely superior in strength, water resistance and resistance to shock.

The objects and advantages of my process, and the resulting product will be understood from the following description.

Briefly, my process consists in cooking wood in an alkaline solution, preferably an alkaline lignin solution such as black liquor from the kraft process, and added elemental sulfur, at elevated temperatures and pressures. The amount of alkaline solution used and the digesting conditions are so regulated that the pH at the end of the cooking is in the range of from 4.5 to 9.5, preferably 8.0 to 9.5. The resulting product retains most of the original lignin in the wood, and has additional lignin from the alkaline solution precipitated therein if an alkali solution containing lignin is used in treating the wood.

Merely as illustrative of a preferred embodiment of my invention, the following example is included, after which I will refer to the variations that may be made within the scope of my invention.

In practice, for example, my process involves the preliminary operation of mixing chips of Douglas fir wood with waste liquor from the sulfate pulping process (kraft process black liquor or, briefly, black liquor) and with elemental sulfur, so that the resulting mixture contains about equal parts by weight of liquor and wood (dry wood basis) and contains between about 3% and about 6% of elemental sulfur, based upon the

2 weight of the black liquor. Mixing is accomplished in any convenient manner and preferably is thorough. Preferably the sulfur is finely ground, i. e. capable of passing a screen having 100 meshes per lineal inch. Suitable mixing is easily effected within a few minutes, especially if conventional motor-powered mechanical means are used. The kraft black liquor used in this illustrative example is the conventional concentrated liquor containing about 50% solids. Since the composition of the black liquor varies somewhat from mill to mill, slight modifications in the black liquor-wood ratios will be required to give the best molded or pressed products; however, this determination is well within the ability of anyone familiar with the art in the light of the disclosure herein. In general, black liquors with any amounts of solids may be used if the alkaline conditions are maintained. The resulting mixture is then transferred to a digester, for example, such as is used in the paper industry, and constructed to withstand the pressures developed in my process, and after the digester is sealed the temperature of the mixture is raised to about 220° C. by the introduction of steam, the pressure inside increasing correspondingly. Since the digester is sealed, the initial percentage of solids in the mixture is not increased but, as the injected steam condenses, the percentage of solids decreases and the charge becomes appreciably diluted. If desired the heating can be accomplished in part or entirely by external heat, in which event the dilution is minimized or eliminated. This cooking is continued for about two hours and then the mixture is cooled either by merely discontinuing the flow of high pressure steam into the cooking vessel and blowing down that vessel slowly enough to prevent undue boiling of the contents, or by adding cool water either internally or to the jacket of the digester. The contents of the digester are then discharged and the solids are separated from substantially all the liquid, suitably, for example, by screening until the solids are drip-free.

If a molded or pressed article is to be produced from these solids, a water mixture is made having a consistency of 1½ to 5%, i. e. containing 1½ to 5 pounds of solids on the dry basis per 100 pounds of mixture. The ratio can be varied outside these limits depending on the equipment used and the molding technique to be followed and may be as high as 10 to 25%. This mixture is passed through a conventional paper pulp beater (or any other conventional paper-making refining equipment) in order to further defibrinate the wood chips. This facilitates washing and imparts to the pulp a freeness which renders it easy to felt and, subsequently, to mold or press.

Sheets or mats in any form can be prepared from the washed pulp and dewatered in the customary manner. By subjecting a mat or a number of such sheets in a bundle pressures up to 2,000 pounds per square inch pressure, preferably 500 to 2,000° p. s. i. and to a temperature of 190 to 500° F., such as 350° F., molded sheets or shaped articles of surprisingly great physical strength and resistance to moisture, compared to similar molded articles of commerce, are obtained.

As indicative of the variations in such a process that may be made without departing from my invention, certain other raw materials and processing conditions may be employed to accomplish substantially the same result. For instance, other woody substances than Douglas fir, such as maple wood, spruce wood, or other tree and woody plant or lignocellulosic materials may be treated in accordance with this process to obtain the claimed results. Likewise, the woody substance need not necessarily be in chip form, the larger or smaller forms being suitable, and the dust or other finely comminuted forms being especially well adapted to certain specific purposes.

Instead of using waste black liquor from the kraft (sulfate) pulping process, any alkaline liquid may be used, such as a solution of an alkali metal hydroxide or any liquor containing lignin such as a sodium lignin salt or its equivalent ligneous material which can be partially or completely precipitated under the digesting conditions in the presence of added elemental sulfur and wood, as in the preferred embodiment of my invention. The black liquor, however, is my preference because of its obvious economic advantages.

Acids are evolved from wood under the cooking conditions mentioned and the pH of the cooking liquor drops during the cooking. The amount of decrease in pH is controlled primarily by the amount of alkaline substances added preliminary to and/or during the digest. In my process where elemental sulfur is present, I prefer that the pH is not allowed to fall below 7.1 and that this be controlled by the adjustment of the ratio of the weight of the black liquor with its alkali content to the dry weight of the wood. I have found that the preferred ratio of the particular black liquor mentioned to the Douglas fir chips is within the range of one part dry wood substance to from 0.5 to 1.5 parts of black liquor. This ratio is given for one specific black liquor but the range of ratios will be approximately the desirable one for any black liquor of about the same concentration and composition. An excess of black liquor is not desirable as it results in a cooking liquor with a pH, during and at the end of the digestion, which is too high to precipitate the dissolved ligneous material satisfactorily. Conversely, too little black liquor results in a cooking liquor with a pH sufficiently acidic to degrade the cellulose in the woody substance and so lower the physical strength and desirability of the final molded or pressed product. It is understood that the proper percentage of elemental sulfur has previously been added to the mixture.

The cooking conditions and the ratio of the constituents of the cooks are regulated or interrelated to give a pre-determined final finishing or terminal pH of the cooking liquor in the digester. The control of the cooking operation may be conveniently done by taking samples of the cooking liquor during the cook and stopping the cook when the desired pH is reached. Since the usual procedure is not to add alkaline material during the cook, this terminal pH is a measure of the cooking process and its use in the specifications and claims is in that sense.

The following table shows the effect on the cooking liquor during the course of digestion and on the terminal pH of varying the ratio of black liquor to dry wood substance. In all cases, the digestion temperature was 205° C. and 5% elemental sulfur, based on the weight of the black liquor, was used. The table shows the pH of samples of the cooking liquor, drained from the digestion at intervals during the digest period. The last sample at the end of the cooking period is the terminal pH referred to throughout the specifications and claims.

*Table 1*

| Parts of Black Liquor to 100 parts of Dry Wood | Minutes of Cooking to Terminal pH | Terminal pH | Approximate pH during Cooking | | |
|---|---|---|---|---|---|
| | | | 90 minutes | 60 minutes | 30 minutes |
| 63.3 | 115 | 6.10 | 6.6 | 7.1 | 7.9 |
| 71.7 | 115 | 6.83 | 7.2 | 7.6 | 7.9 |
| 87.5 | 105 | 8.07 | 8.2 | 8.5 | 8.8 |
| 100 | 120 | 8.58 | 8.7 | 8.8 | 8.9 |
| 105 | 115 | 8.80 | 8.9 | 9.0 | 9.1 |
| 112.5 | 115 | 8.90 | 9.0 | 9.1 | 9.2 |

Preferably the liquor to wood ratio is .5 to 2.0 parts of liquor to one part of wood, and the cooking time is ¼ to 4 hours. The ratio of liquor to wood, the cooking time, and the temperature are interrelated to achieve the desired terminal pH. Satisfactory results can be obtained if the terminal pH of the cooking operation is held in the range between about 4.5 and about 9.5. Most physical properties of the ultimate molded article of the wood substance appear to be desirably enhanced if the terminal pH is maintained between about 8.0 and about 9.5 when elemental sulfur is present in a proper proportion.

Generally, satisfactory results are obtainable if the added elemental sulfur is present in the cooking mixture of wood and black liquor in an amount between about 1% and about 20% of the weight of the black liquor. The more narrow range of about 3% to about 6% is my preference for routine operation. Indications are that best results will be most consistently obtained if the sulfur is employed in an amount about 5% by weight of the black liquor. The ratio of sulfur to black liquor may vary depending principally on the concentration of black liquor and to some extent on its constituents. The figures given are on the basis of a representative concentrated black liquor containing about 5% solids. With other liquor, equivalent ratios can easily be established.

The cooking operation is preferably conducted at a temperature between about 210° C. and about 285° C. but may suitably be effected at any temperature between about 150° C. and about 285° C. accompanied by the corresponding change in the duration of the digestion and possibly the liquor-wood ratio to obtain the desired terminal pH. The pressure is that obtained at the stated temperature but may be as high as 1000 pounds per square inch and as low as 150 pounds per square inch.

To illustrate the effect of some of the variables, the following representative cooks with a black liquor to wood ratio of 87.5 to 100 are shown and the properties of the resulting molded product are given.

*Table 2*

| Cook No. | Percent S, Basis of Black Liquor | Flex. Strength | | Mod. of Elasticity, p. s. i. × 10⁴ | | Impact Strength (notched Izod) Ft. lb. per in. notch | | Moisture Absorption[1] | |
|---|---|---|---|---|---|---|---|---|---|
| | | Flatwise, p. s. i. | Edgewise, p. s. i. | Flat. | Edge. | Flat. | Edge. | Percent 1 day | Percent 10 days |
| 1 | 0 | 9,400 | 12,800 | 67 | 73 | 8.2 | 2.74 | 17.24 | |
| 2 | 2 | 11,700 | 14,000 | 106 | 88 | 8.65 | 2.24 | 2.53 | |
| 3 | 3 | 14,300 | 15,200 | 105 | 87 | 7.67 | 2.07 | 2.73 | |
| 4 | 5 | 23,600 | | 108 | | 5.6 | 1.23 | 1.27 | 4.0 |
| 5 | 8 | 15,000 | 17,200 | 98 | 96 | 9.2 | 1.88 | 2.50 | |
| 6 | 10 | 13,900 | 15,700 | 87 | 88 | 5.8 | 1.67 | 2.68 | |

[1] The Water Absorptions were taken on samples ¼″ x 1″ x 6″.

The impact strengths of the molded samples from cooks 2 and 5 appear inordinately high. This was caused by poor plastic flow during molding and a consequent shredding of the fiber at the moment of impact in the Izod test as contrasted with the clean fracture of a properly homogeneous molded product.

In this series of cooks, the digestion conditions were held identical and the black liquor-wood ratio constant while the black liquor-sulfur ratio was varied. The results show the advantage of cooking with sulfur and the improved physical properties of the molded product when the sulfur was limited to the narrower range of from 3 to 6% based on the weight of the black liquor used.

In order to show the effect of cooling by blowing down the mixture without cooling water in the jacket as compared with cooling by cooling water in the jacket of the digester, the following table is included:

*Table 3*

| Cook No. | Conditions | Flex. Strength | | Mod. of Elasticity, p. s. i. × 10⁴ | | Impact Strength (notched Izod), Ft. lbs. per in. notch | | Moisture Absorption | |
|---|---|---|---|---|---|---|---|---|---|
| | | Flatwise, p.s.i. | Edgewise, p.s.i. | Flat. | Edge. | Flat. | Edge. | Per cent 1 day | Per cent 10 days |
| 7 | Cooled | 16,800 | 18,600 | 99 | 112 | 6.8 | 1.50 | 2.2 | 5.5 |
| 8 | Blown down | 14,500 | 15,600 | 86 | 75 | 8.0 | 2.4 | 3.4 | 8.8 |

These results indicate that the blown and cooled cooks are somewhat similar.

The following table compares the results of using black liquor and a non-lignin-containing liquor comprising a solution of sodium hydroxide. The amount of sulfur is 5% in each case.

*Table 4*

| Cook No. | Hyd. Liq. | Flex. Strength | | Mod. of Elasticity, p. s. i. ×10⁴ | | Impact Strength (notched Izod), Ft. lbs. per in. notch | | Moisture Absorption | |
|---|---|---|---|---|---|---|---|---|---|
| | | Flatwise, p.s.i. | Edgewise, p.s.i. | Flat. | Edge. | Flat. | Edge. | Per cent 1 day | Per cent 10 days |
| 9 | Bl. Liq | 13,100 | 12,300 | 123 | 138 | 5.0 | 1.13 | 2.04 | 5.5 |
| 10 | NaOH | 7,200 | 14,000 | 81 | 82 | | 3.9 | 17.24 | |

The edgewise flexural test indicates a slight improvement in this property, and the edgewise impact shows a definite improvement from substituting NaOH for kraft liquor. The resistance to moisture is adversely affected due to decreased plasticity in the pulp from the NaOH cook, hence the effect of substituting sodium hydroxide for black liquor in the presence of (elemental) sulfur is to decrease plasticity as reflected in the poorer water resistance of the product digested with sodium hydroxide. If desired a mixture of black liquor and sodium hydroxide solution can be used to achieve the optimum properties desired.

The following table shows the effect of varying the ratio of black liquor to wood:

Table 5

| Cook No. | Percentage Bl. Liq. to Wood | Terminal pH Sample | Flex. Strength | | Mod. of Elasticity, p. s. i. ×10⁴ | | Impact Strength (notched Izod), Ft. lbs. per in. notch | | Moisture Absorption | |
|---|---|---|---|---|---|---|---|---|---|---|
| | | | Flatwise, p. s. i. | Edgewise, p. s. i. | Flat. | Edge. | Flat. | Edge. | Per cent 1 day | Per cent 10 days |
| 11 | 63.3 | 6.10 | 15,200 | 16,600 | 95 | 93 | 5.8 | 2.0 | 2.3 | 6.4 |
| 12 | 71.7 | 6.83 | 17,000 | 17,200 | 96 | 85 | 6.2 | 2.3 | 2.0 | 5.6 |
| 13 | 87.5 | 8.07 | 23,600 | -------- | 108 | -------- | 5.6 | 1.2 | 1.27 | 4.0 |
| 14 | 105. | 8.80 | 16,800 | 18,600 | 99 | 112 | 6.8 | 1.5 | 2.20 | 5.5 |
| 15 | 112.5 | 8.90 | 14,600 | 16,500 | 93 | 98 | 8.45 | 1.8 | 2.60 | -------- |

Five percent sulfur was used in all these cooks. The influence and relation of the amount of black liquor to the terminal pH is shown in Table 1. It is seen that all of these cooks give better molded products than the samples molded from cook #1 in Table 2, and that the properties of molded samples from the cooks made at the higher pH terminal (above 8.0) are, in general, the best.

Herein and in the claims where a ratio, proportion or percentage is expressed the weight basis is referred to unless the contrary is expressly stated.

The term moldable in the following claims is used broadly to mean pressing under any of the conventional methods that are used in the molding, laminating or synthetic board field such as in the production of "Masonite" products.

Having thus described the present invention so that others skilled in the art may be able to understand and practice the same, I state that what I desire to secure by Letters Patent is defined in what is claimed.

I claim:

1. A process of producing a moldable composition comprising digesting lignocellulose under pressure and at a temperature in the range from 150 to 250° C. with a mixture of black liquor comprising 3 to 6% sulfur on the weight of the black liquor, the amount of said mixture and the length of the digestion being such as to provide a terminal pH of from 7.5 to 9.5.

2. A process of producing a molded product comprising digesting lignocellulose under pressure at a temperature in a range from 150 to 250° C. with a mixture of black liquor comprising 3 to 6% elemental sulfur on the weight of the black liquor, the amount of said mixture and the length of digestion being such as to provide a terminal pH of 7.5 to 9.5, refining the product, washing it to remove substantially all the water soluble material, felting into the desired shape, and pressing under heat and pressure.

3. A process for producing a moldable composition comprising digesting a woody material under pressure and at a temperature between 150° and 285° C. in an alkaline solution and in the presence of from 1% to 20% of elemental sulfur based on the alkaline solution to obtain a terminal pH of between 4.5 and 9.5.

4. A process for producing a moldable composition comprising digesting a woody material under pressure and at a temperature between 150° and 285° C. in the presence of an alkaline solution comprising black liquor and elemental sulfur, the sulfur being present in an amount equal to from 1% to 20% of the weight of the black liquor, to obtain a terminal pH of between 4.5 and 9.5.

5. A process for producing a moldable composition comprising digesting a woody material under pressure and at a temperature between 150° and 285° C. in a solution of an alkali metal hydroxide and in the presence of elemental sulfur, said sulfur being present in an amount equal to between 1% to 20% of the weight of the alkaline solution present, to obtain a terminal pH of between 4.5 and 9.5.

6. A process for producing a moldable composition comprising digesting lignocellulose under pressure and at a temperature between 150° and 285° C. with a mixture of black liquor and elemental sulfur, the amount of black liquor being between 0.5 and 1.5 times the weight of the wood on the dry basis, and the amount of sulfur being between 1% and 20% of the weight of the black liquor, the black liquor being adjusted in an amount to yield a terminal pH of between 4.5 and 9.5.

7. A process for producing a moldable composition comprising digesting lignocellulose under pressure and at a temperature in the range between 150° and 285° C. with a mixture of black liquor comprising 1% to 20% of elemental sulfur on the weight of the black liquor, the amount of said mixture being such as to provide a terminal pH of between 7.5 to 9.5.

8. A process for producing a shaped product comprising digesting lignocellulose under pressure and at a temperature of between 150° and 285° C. with an alkaline mixture comprising ligneous material and elemental sulfur, the sulfur being present in an amount equal to from 1% to 20% of the weight of the ligneous material, to a terminal pH of 4.5 to 9.5, washing the same and then molding under heat and pressure to a hard, dense, strong, water-resistant product.

9. A process for producing a molded product comprising digesting lignocellulose under pressure for a period of between one-quarter and four hours and at a temperature in the range of 150° to 285° C. with an amount of a mixture of black liquor comprising 3% to 6% of elemental sulfur on the weight of the black liquor, to provide a terminal pH of 4.5 to 9.5, cooling the reaction mass, washing and molding the product of said digestion under heat and pressure into a hard, dense, water-resistant product.

10. A molded, hard, dense, water-resistant product resulting from the shaping under heat and pressure of the washed reaction product of the process of claim 3.

11. A molded, hard, dense, water-resistant product resulting from the shaping under heat and pressure of the washed reaction product made in accordance with the process of claim 7.

12. The product of claim 8.

JOHN G. MEILER.

REFERENCES CITED

The following references are of record in the file of this patent:

UNITED STATES PATENTS

| Number | Name | Date |
|---|---|---|
| 142,892 | Bretonnaire | Sept. 16, 1873 |
| 1,212,158 | Waite | Jan. 9, 1917 |
| 1,249,287 | Waite | Dec. 4, 1917 |
| 1,714,459 | Wells | May 21, 1929 |
| 1,714,831 | Tingle | May 28, 1929 |
| 2,161,763 | Jones | June 6, 1939 |
| 2,292,390 | Meiler | Aug. 11, 1942 |
| 2,379,889 | Dorland | July 10, 1945 |

Certificate of Correction

Patent No. 2,490,078 December 6, 1949

JOHN G. MEILER

It is hereby certified that error appears in the printed specification of the above numbered patent requiring correction as follows:

Column 5, line 4, for "5%" read *50%*;

and that the said Letters Patent should be read with this correction therein that the same may conform to the record of the case in the Patent Office.

Signed and sealed this 4th day of April, A. D. 1950.

[SEAL]

THOMAS F. MURPHY,
*Assistant Commissioner of Patents.*